UNITED STATES PATENT OFFICE.

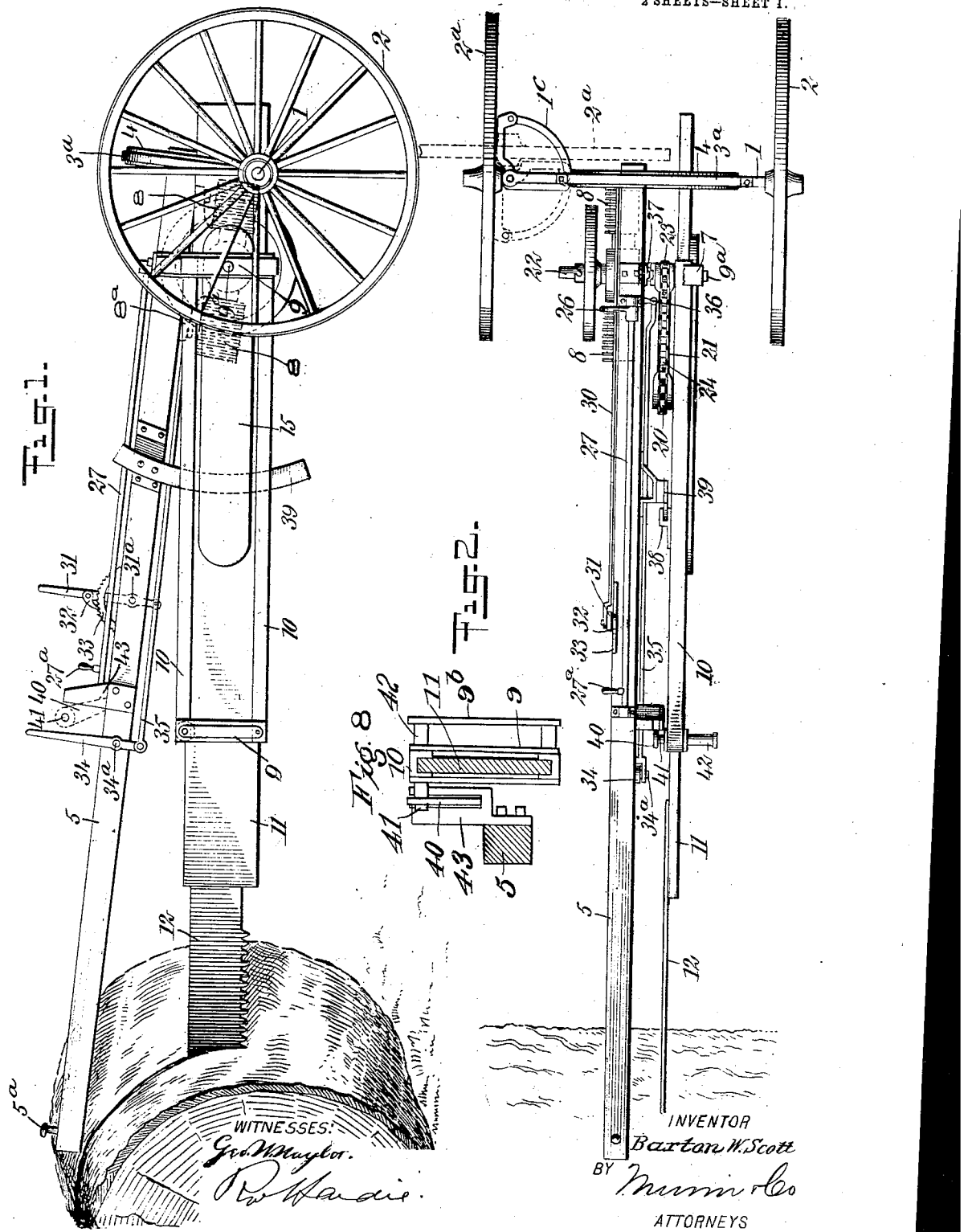

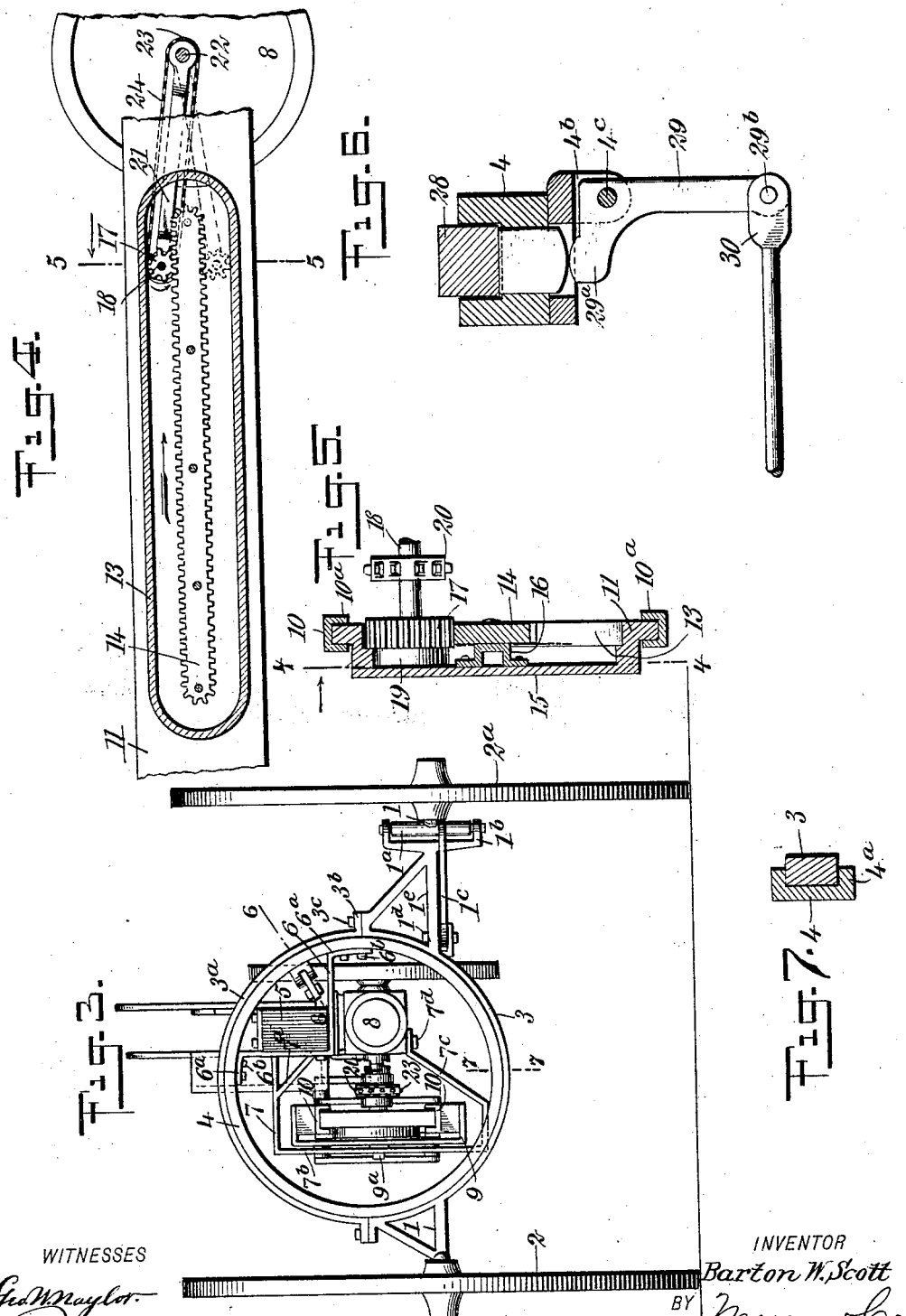

BARTON W. SCOTT, OF SAN JOSE, CALIFORNIA.

DRAG-SAW.

No. 870,474.

Specification of Letters Patent.

Patented Nov. 5, 1907.

Application filed December 1, 1906. Serial No. 345,880.

*To all whom it may concern:*

Be it known that I, BARTON W. SCOTT, a citizen of the United States, and a resident of San Jose, in the county of Santa Clara and State of California, have invented a new and Improved Drag-Saw, of which the following is a full, clear, and exact description.

This invention relates to sawing mechanism designed to be used among growing timber, and has for its object to provide means capable of being readily moved about and adapted to saw through a standing tree, and also to saw the trunk and limbs into sections where the tree was felled.

Other objects relating to the specific construction and special arrangement of the several parts of my invention will be understood by the following description and accompanying drawings, in which drawings Figure 1 is a side elevation of a device embodying my invention; Fig. 2 is a plan of the same; Fig. 3 is an end view of the device shown in Figs. 1 and 2; Fig. 4 is a sectional side elevation of a double rack and connecting mechanism, taken on the line 4—4 of Fig. 5; Fig. 5 is a vertical transverse section taken on the line 5—5 of Fig. 4; Fig. 6 is a side elevation, partly in section, of a frictional brake taken on the line 6—6 of Fig. 3; Fig. 7 is a vertical transverse section taken on the line 7—7 of Fig. 3, and Fig. 8 is a vertical transverse section taken on the line 8—8 of Fig. 2.

As illustrated in the drawings, the main frame of my device with its connected mechanism, is mounted upon an auxiliary frame which may be made stationary, if desired, but it preferably consists of an axle 1 journaled upon carrying wheels 2, 2ᵃ and provided with an axle ring composed of a lower section 3 and upper section 3ᵃ, having off-set ends 3ᵇ secured to the lower section 3 by means of bolts 3ᶜ. The main frame consists of a ring 4 having a beam 5, secured thereto by means of a bracket 6 having off-set ends 6ᵃ, which are secured to the ring 4 by means of bolts 6ᵇ. The ring 4 is provided with flanges 4ᵃ forming an annular recess adapted to receive the outer ring sections 3 and 3ᵃ, as shown in Fig. 7, whereby the main frame and its connected mechanism are rotatably mounted upon the carrying frame. A bracket 7 is secured at its upper end to the beam 5 in any suitable manner, and is preferably provided with a brace bar 7ᵃ secured to the side of said beam, a vertical section 7ᶜ extending downward and a lateral section 7ᵒ which extends upward from the vertical section and is secured by means of bolts 7ᵈ to an engine 8 that is secured in any suitable manner to the beam 5, preferably by means of flanges 8ᵃ formed on the bed plate or casing of the engine, as indicated by dotted lines in Fig. 1. A saw beam frame is pivotally mounted upon the bracket 7 by means of a pivot 9ᵃ secured to the end bars 9 of said frame, which are connected at their ends with longitudinal guide bars 10, as shown in Fig. 1. The bars 10 are preferably provided with longitudinal flanges 10ᵃ shown in Fig. 5, thereby forming channels adapted to receive and permit the saw beam 11 to move backward and forward therein, while carrying a saw 12 which may be secured to the saw beam 11 in any suitable manner.

The guide bars 10 may form a bearing throughout their entire length for the saw beam 11, or if desired a channel may be made on the ends of said bars only, thereby forming end bearings and wearing plates for the saw beam, the main portion of said bars 10 in such case serving simply as a frame to carry and guide the saw beam. An elongated aperture is formed in the saw beam 11 adapted to receive an endless track 13 shown in Fig. 4, and a double rack bar 14 connected with said track. Said aperture may be made by cutting entirely through the saw beam in which case a plate 15 is secured to the side of the beam, as shown in Fig. 1. Instead of cutting entirely through the beam, however, the beam may be made with an off-set portion corresponding in shape to said track and formed integral with the beam, as shown in Fig. 5. In either construction the double rack 14 is mounted upon a longitudinal bar 16, which is secured to the off-set portion of the beam or the plate 15 secured thereto. The double rack 14 engages a pinion 17 which is mounted upon a stub shaft 18, having attached to one end thereof a roller 19 which bears against the inner surface of the track 13, while the pinion 17 rotates on the double rack 14. A sprocket wheel 20 is also attached to the stub shaft 18, and the stub shaft is journaled on a forked arm 21, one end of said arm being loosely journaled on the driving shaft 22 of the engine 8. The shaft 22 is provided with a sprocket wheel 23 loosely secured thereto, as shown in Fig. 2, adapted to carry a sprocket chain 24 which is also connected with the sprocket wheel 20, thereby transmitting motion from the shaft of the engine to the sprocket wheel 20 and the saw beam 11 by means of the pinion 17 and rack 14.

The engine 8 may be of any desired construction. I prefer, however, to use the ordinary automobile gasolene engine, of the double crank, double cylinder type, and of about five horse power. Being of the well known construction I have omitted from the drawings gasolene tank, battery, throttle valve and other well known elements commonly used with an engine of such construction. A throttle valve lever 26 is connected with the throttle valve of the engine, and mounted upon a shaft 27 provided with an operating handle 27ᵃ arranged within convenient reach of the operator. A brake is also provided adapted to lock the main frame in any desired position on the carrying frame, and consists of a block 28, shown in Fig. 6, having a sliding movement in a transverse aperture formed in the ring 4 of the main frame. Lugs 4ᵇ are formed upon said ring, and provided with a hinge pin 4ᶜ upon which is mounted a lever 29, the free end 29ᵃ of which bears against the inner end of the block or shoe 28, while its opposite end is pivotally connected by means of a pivot pin 29$^b$ with a rod 30, the forward end of which rod is pivotally attached to a lever 31 mounted upon the beam 5 by means of a pivot pin 31$^a$, and provided with a pawl 32 which engages a notched segment 33 secured to said beam. By means of said lever 31 the brake lever 29 is released from contact with the shoe or block 28, or held in engagement therewith as desired. A lever 34 is pivotally mounted upon the beam 5 by means of a pivot 34$^a$ in convenient relation to the brake lever 31 and the throttle lever 27. The end of the lever 34 is pivotally connected with a rod 35, which at its rear end is pivoted to a bell crank lever 36 connected with a clutch 37 mounted upon the driving shaft 22 of the engine. The beam 5 and saw beam 11 are held together by means of a guide plate 38 secured to the saw beam frame, and adapted to receive and hold against lateral movement a sector plate 39 secured at its upper end to the beam 5. One of the axles of the carrying frame is secured to a vertical pivot 1$^a$ journaled in a yoke 1$^b$. A horizontal yoke 1$^c$ is rigidly attached to the pivot pin 1$^a$ and held in place when the wheels are parallel with each other by means of a bolt 1$^d$, extending through the axle bar 1$^e$ and the horizontal bracket 1$^e$. When desired, by releasing the pin 1$^d$ one of the wheels, 2$^a$, of the carrying frame may be arranged at a right angle to the plane of the opposite wheel, as indicated by dotted lines in Fig. 2, so that by lifting the wheel 2 the entire carrying frame may be moved sidewise on the wheel 2$^a$.

When the device is in use, the beam 5 is secured to a log or tree by means of a spike 5$^a$ extending through said beam. As illustrated in Fig. 1, the beam is attached to a log lying on its side. The operation is the same, however, in cutting a standing tree. In that case the entire main frame of the device is rotated on the axle ring of the carrying frame, until the saw 12 and beam 5 are arranged in a horizontal plane. The end of the beam 5 is then secured to the side of a tree, thereby arranging the saw 12 in position to cut horizontally through the trunk of the tree. After the carrying frame has been secured in position, the engine 8 is started by means of a crank attached to the driving shaft 22. The clutch is then applied to the driving mechanism so as to run the saw slowly until after it has obtained a proper hold on the tree or log, when the engine may be run at full speed, slackened up as the saw is nearly through the cut, and stopped entirely after cutting through the log. When the clutch 37 of the engine shaft 22 is connected with the operating mechanism, the shaft 22 rotates the sprocket wheel 23 which is mounted upon the shaft 22 and also the sprocket wheel 20 mounted on the shaft 18, which is connected to the sprocket wheel 23 by means of an endless chain 24. As the pinion 17 is rotated in the direction of the curved arrow shown in Fig. 4, it draws the double rack 14 and the saw beam 11 to the right, as indicated by the straight arrow in Fig. 4. After reaching the left end of the rack 14 the pinion 17 drops down to the lower portion of the rack 14 and moves said rack and the sash frame in an opposite direction, thereby causing the saw beam 11 and the saw 12 secured thereto to move backward and forward and produce a sawing movement.

After a tree has been cut down in the manner described, the trunk and branches may be cut into sections of any desired length, by turning the wheel 2$^a$ into the position indicated by dotted lines in Fig. 2, lifting the wheel from the ground and carrying the device on the wheel 2$^a$. The forward end of the saw beam frame is provided with a handle consisting of a bar 9$^b$ attached to spools 42, by means of which the forward end of said frame may be raised when desired. A hand operated latch 40 is mounted upon a pivot pin 41 at the forward end of the saw beam frame, and its free end is adapted to be placed in engagement with a notch formed in a block 43 secured to the beam 5, as indicated by dotted lines in Fig. 1, thereby supporting the saw beam on the main beam 5 when the device is not in use.

Having thus described my invention, what I claim as new and desire to secure by Letters Patent is:

1. The combination with an auxiliary frame, of a main frame rotatably mounted thereon, a saw beam frame pivoted to said main frame, a saw beam having a reciprocating movement in said frame, a double rack and run-way connected with said saw beam, a beam fixedly secured to said main frame, an engine secured to said beam, a lever loosely mounted on the drive shaft of said engine, and a pinion and roller mounted on the end of said shaft and adapted to engage said rack bar and run-way of the saw beam.

2. The combination with an auxiliary frame, of a main frame rotatably mounted thereon, a beam fixedly secured to the main frame, an engine mounted on said main frame, a saw beam frame pivoted to the main frame, a saw beam adapted to reciprocate in said beam frame, mechanism connected with said engine adapted to operate said saw beam, a shoe movable in an aperture formed in the main frame, a lever adapted to bear against the end of said shoe, a connecting rod pivoted to said lever, and a lever mounted upon said beam connected with said rod and provided with a pawl and ratchet.

3. The combination with an auxiliary frame having a carrying wheel adapted to be arranged parallel to or at right angles with an opposite carrying wheel, a main frame rotatably mounted on said auxiliary frame, a saw beam frame pivotally secured to said main frame, a saw beam adapted to reciprocate in said frame, an engine mounted on the main frame, and mechanism connected therewith adapted to operate said saw beam.

4. The combination with an auxiliary frame, of a main frame rotatably mounted thereon, a beam fixedly secured to the main frame, an engine secured to the main frame, a saw beam frame pivotally mounted upon the main frame, a saw beam adapted to reciprocate in said beam frame, and provided with a run way and double rack, and mechanism connected with said engine and saw beam, comprising a roller adapted to engage said run-way, a pinion adapted to engage said double rack, and a sprocket wheel connected with said roller and pinion and the axle of said engine.

5. The combination with an auxiliary frame mounted upon wheels, one of which is adapted to be arranged at a right angle to the other, a main frame rotatably mounted upon said auxiliary frame, a beam fixedly secured to said main frame, an engine secured to said main frame, a bracket secured to said beam and engine, a saw beam frame pivoted to said bracket, a saw beam adapted to reciprocate in said saw beam frame, and mechanism connected with said engine adapted to operate said saw beam.

6. The combination with an auxiliary frame, of a main frame having a horizontal axis, rotatably mounted on the auxiliary frame, a saw beam frame pivotally secured to the main frame, a saw beam having a reciprocating longitudinal movement on said frame and means for operating said saw beam.

7. The combination with an auxiliary frame mounted on carrying wheels, of a main frame having a horizontal axis, rotatably mounted on the auxiliary frame, a saw beam frame pivotally secured to the main frame, a saw beam having a reciprocating longitudinal movement on said frame, and means for operating said beam.

8. The combination with an auxiliary frame, of a main frame having a horizontal axis, rotatably mounted on the auxiliary frame, a saw beam frame pivoted to the main frame, a beam fixedly secured to the main frame, an engine secured to the main frame, and mechanism detachably connected with said engine adapted to operate said saw beam.

9. The combination with an auxiliary frame, of a main frame rotatably mounted on the auxiliary frame, a beam fixedly secured to said frame, an engine mounted on said frame, a saw beam frame pivoted to the main frame, a saw beam adapted to reciprocate in said beam frame, mechanism connected with said engine and beam, adapted to operate said saw beam, and a brake adapted to hold the main frame against rotary motion on the auxiliary frame.

10. The combination with an auxiliary frame comprising an axle mounted upon wheels, and provided with a vertical ring, of a main frame comprising a ring adapted to rotate on the auxiliary frame with a horizontal axis, a beam fixedly secured to the main frame, a saw beam frame pivotally mounted on the main frame, an engine secured to said main frame, and mechanism connected with said engine and adapted to operate said saw beam.

11. The combination with an auxiliary frame having a vertically pivotal movement on a horizontal axis, a main frame rotatably mounted with a horizontal axis on the auxiliary frame, an engine and main beam secured to the main frame, a saw beam mounted on the main frame and having a reciprocating movement thereon, and driving mechanism connected with said engine and saw beam.

In testimony whereof I have signed my name to this specification in the presence of two subscribing witnesses.

BARTON W. SCOTT.

Witnesses:
JAMES F. CAREY,
W. A. KARNS.